United States Patent
Cardona et al.

(10) Patent No.: US 10,621,632 B1
(45) Date of Patent: *Apr. 14, 2020

(54) REAL PROPERTY IMAGE ANALYSIS SYSTEM TO ANALYZE PROPERTY REPAIRS AND IMPROVEMENTS

(71) Applicant: STATE FARM MUTUAL AUTOMOBILE INSURANCE COMPANY, Bloomington, IL (US)

(72) Inventors: Alexander Cardona, Bloomington, IL (US); Erin A. Olander, Bloomington, IL (US); John A. Schirano, Bloomington, IL (US); Dana C. Hunt, Normal, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/399,627

(22) Filed: Apr. 30, 2019

Related U.S. Application Data (63) Continuation of application No. 15/201,078, filed on Jul. 1, 2016, now Pat. No. 10,319,002.

(51) Int. Cl.
  *G06K 9/00* (2006.01)
  *G06Q 30/02* (2012.01)
  *G06F 3/0484* (2013.01)
  *H04L 29/08* (2006.01)
  *G06Q 50/16* (2012.01)

(52) U.S. Cl.
  CPC ..... *G06Q 30/0283* (2013.01); *G06F 3/04842* (2013.01); *G06K 9/00671* (2013.01); *H04L 67/18* (2013.01); *G06Q 50/163* (2013.01)

(58) Field of Classification Search
  CPC ............. G06Q 30/0283; G06Q 50/163; G06F 3/04842; H04L 67/18; G06K 9/00671
  See application file for complete search history.

(56) References Cited

U.S. PATENT DOCUMENTS

| | | |
|---|---|---|
| 10,319,002 B1 * | 6/2019 | Cardona ............ G06Q 30/0283 |
| 2014/0258042 A1 | 9/2014 | Butler et al. |
| 2016/0048934 A1 | 2/2016 | Gross |
| 2016/0092959 A1 | 3/2016 | Gross |

\* cited by examiner

*Primary Examiner* — Tom Y Lu
(74) *Attorney, Agent, or Firm* — Marshall, Gerstein & Borun LLP (57) ABSTRACT

Systems and methods for analyzing image data depicting portions of properties are disclosed. According to certain aspects, an electronic device may analyze image data depicting a portion of a property to identify a set of elements and a set of characteristics associated therewith. The electronic device may access a desired set of characteristics and may calculate a monetary amount associated with modifying the set of elements to achieve the desired set of characteristics.

20 Claims, 7 Drawing Sheets

REAL PROPERTY IMAGE ANALYSIS SYSTEM TO ANALYZE PROPERTY REPAIRS AND IMPROVEMENTS

CROSS-REFERENCE TO RELATED APPLICATIONS

This application is a continuation of U.S. patent application Ser. No. 15/201,078, filed Jul. 1, 2016, the disclosure of which is hereby incorporated by reference in its entirety.

FIELD

The present disclosure is directed to analyzing image data depicting properties. More particularly, the present disclosure is directed to systems and methods for analyzing image data to determine information related to property repairs and improvements.

BACKGROUND

Individuals frequently browse or search for properties for sale or for rent, such as when looking to purchase (or rent) or sell a property, when gauging market conditions, or for other reasons. Technology and connected devices have made property searches easier and more efficient. In particular, certain mobile applications enable users to locate nearby properties for sale and view listing images associated with the properties, among other information.

Individuals frequently consider whether to purchase or rent a property that may need certain repairs or improvements (and thus may be priced lower relative to other properties), or purchase or rent a "turnkey" property that may not need similar repairs or improvements (and thus may be priced higher relative to other properties). Currently, these individuals must manually gauge the need for repairs or improvements and costs associated therewith, and manually determine which properties may offer better value or other benefits. However, these assessments are often inaccurate and time-consuming.

Accordingly, there is an opportunity for systems and methods to analyze image data depicting portions of property to determine information related to necessary repairs or improvements.

SUMMARY

According to embodiments, a computer-implemented method in an electronic device of analyzing image data to identify property modifications is provided. The method may include capturing, by an image sensor, image data depicting a set of elements associated with a portion of a property, analyzing, by a processor, the image data to identify a set of characteristics associated with the set of elements, accessing a desired set of characteristics corresponding to the set of elements, calculating a monetary amount associated with modifying the set of elements having the set of characteristics to achieve the desired set of characteristics, and presenting, in a user interface, an indication of the monetary amount.

In another embodiment, an electronic device configured to analyze image data to identify property modifications is provided. The electronic device may include an image sensor configured to capture image data, a user interface, a memory configured to store non-transitory computer executable instructions, and a processor configured to interface with the image sensor, the user interface, and the memory. The processor may configured to execute the non-transitory computer executable instructions to cause the processor to, access the image data from the image sensor, the image data depicting a set of elements associated with a portion of a property, analyze the image data to identify a set of characteristics associated with the set of elements, access a desired set of characteristics corresponding to the set of elements, calculate a monetary amount associated with modifying the set of elements having the set of characteristics to achieve the desired set of characteristics, and cause the user interface to present an indication of the monetary amount.

According to another embodiment, a computer-implemented method of analyzing image data to identify property modifications is provided. The method may include receiving, from an electronic device via a wireless network connection, image data depicting a set of elements associated with a portion of a property, analyzing, by a processor, the image data to identify a set of characteristics associated with the set of elements, accessing a desired set of characteristics corresponding to the set of elements, calculating a monetary amount associated with modifying the set of elements having the set of characteristics to achieve the desired set of characteristics, and sending, to the electronic device via the wireless network connection, data indicative of the monetary amount, wherein the electronic device presents an indication of the monetary amount.

DETAILED DESCRIPTION

The present embodiments may relate to, inter alia, dynamically and automatically analyzing image data to determine information related to property repairs and improvements. According to certain aspects, the systems and methods may capture image data depicting portion of properties, and analyze the image data to identify a set of elements and characteristics thereof that are depicted in the image data. The systems and methods may further access a desired set of characteristics and calculate a monetary amount associated with modifying the set of elements to achieve the desired set of characteristics.

The systems and methods therefore offer numerous benefits. In particular, the systems and methods dynamically and automatically perform calculations and estimations related to property repairs, modifications, or improvements, which enables individuals to gauge costs associated with purchasing properties. Additionally, the systems and methods enable more views of properties available for purchase or rent, which potentially increases the value of the properties. Further, the systems and methods may identify similar properties having different associated costs, which provides individuals with more information in determining which properties to purchase or rent. It should be appreciated that other benefits are envisioned.

The systems and methods discussed herein address a business challenge, namely a business challenge related to improving how individuals browse for and consider available properties. In conventional applications, individuals may view various information related to properties to potentially narrow a property search. In contrast, the systems and methods utilize multiple electronic devices connected via one or more wireless connections to analyze image data depicting portions of properties and dynamically perform analyses and calculations related to potential property repairs and improvements.

Therefore, the systems and methods do not merely recite the performance of some business practice known from the pre-Internet world (browsing and considering available properties) along with the requirement to perform it on the Internet. Instead, the systems and methods are necessarily rooted in computer technology in order to overcome a problem specifically arising in computer networks.

Further, it should be appreciated that the systems and methods may include specialized (i.e., non-generic) or dedicated components capable of performing specialized (i.e., non-generic) or dedicated computer functions. In particular, the systems and methods employ various device sensors (e.g., image sensors) that are specifically configured to collect certain data (e.g., image data). Further, electronic devices interface with the specialized sensors to collect the data and analyze the data.

According to implementations, the systems and methods may support a dynamic, real-time or near-real-time collection, analysis, and communication of any data that may be associated with the assessments and analyses. In particular, the systems and methods may dynamically and automatically collect image data from image sensors in real-time or near-real-time, may automatically and dynamically analyze the collected data, and may automatically and dynamically analyze and calculate potential property repairs and improvements.

Figure 1:
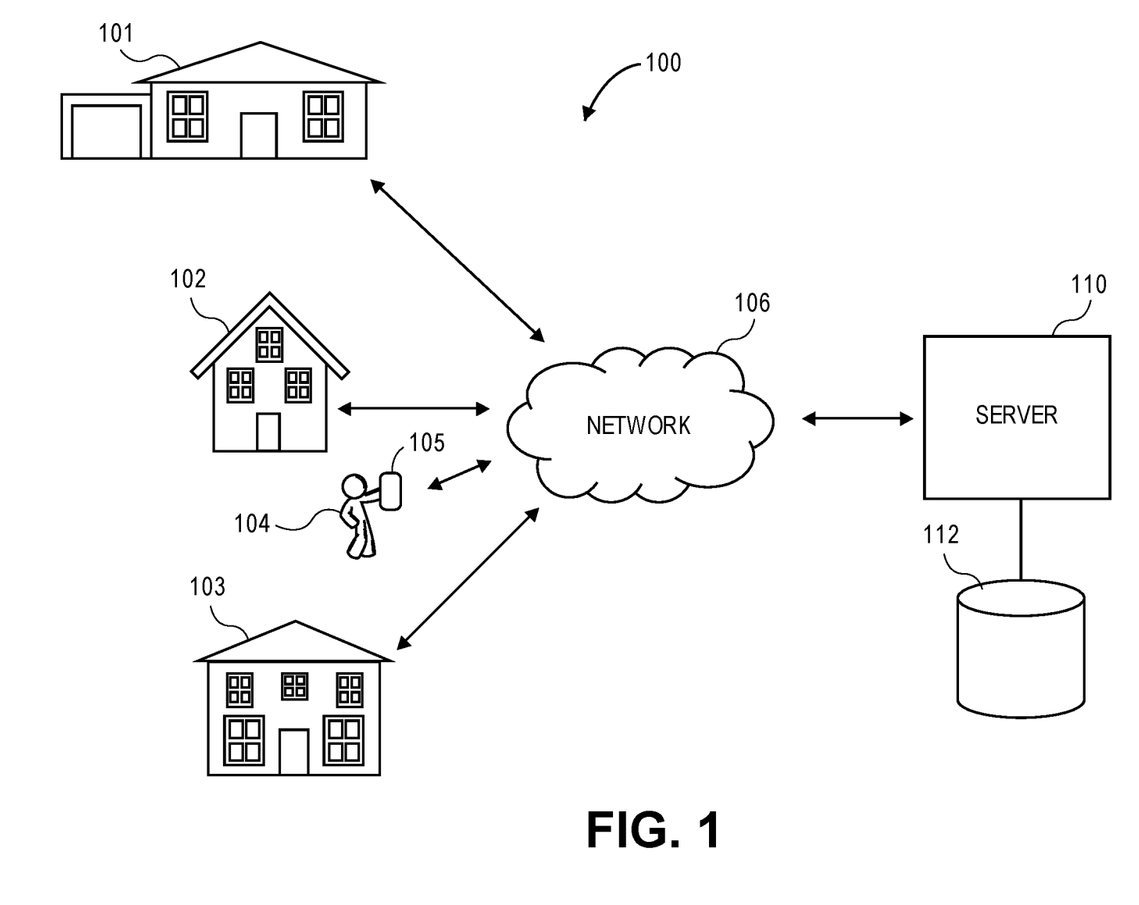
FIG. 1 depicts an overview of an exemplary system of components configured to facilitate various functionalities, in accordance with some embodiments.

FIG. 1 illustrates an overview of a system 100 of components configured to facilitate the systems and methods. It should be appreciated that the system 100 is merely exemplary and that alternative or additional components are envisioned.

As illustrated in FIG. 1, the system 100 depicts a set of properties 101, 102, 103. Although FIG. 1 depicts three (3) properties, it should be appreciated that fewer or additional properties are envisioned. Generally, each of the properties 101, 102, 103 may be a dwelling in which individuals may reside, such as a home or an apartment. However, it should be appreciated that the properties 101, 102, 103 may extend to other types of properties such as office buildings, farms, and/or other types of properties or buildings.

According to embodiments, each of the properties 101, 102, 103 may include one or more portion(s), each of which may be associated with an exterior or interior of the property 101, 102, 103. In particular, an interior portion of a property may be a room or designated area of the property (e.g., bedroom, kitchen, bathroom, basement, study/office, family room, dining room, living room, hallway, entryway, foyer, etc.). Further, an exterior portion of a property may be a distinct feature or component of the property such as a roof, a doorway, a window(s), foundation or construction details, and/or the like. A portion may also be any auxiliary buildings of the property (e.g., a shed or a garage), and/or any other portion that may be visible and capable of being captured in image data.

FIG. 1 illustrates a user 104 or individual having or interacting with an electronic device 105. The user 104 may be any individual or person who may view any of the properties 101, 102, 103. For example, the user 104 may be a person who is interested in purchasing or renting the property 102, which may be available for purchase or rent. The electronic device 105 may be any type of electronic device such as a mobile device (e.g., a smartphone), notebook computer, tablet, phablet, GPS (Global Positioning System) or GPS-enabled device, smart watch, smart glasses, smart bracelet, wearable electronic, PDA (personal digital assistant), pager, computing device configured for wireless communication, and/or the like.

The electronic device 105 may be configured to communicate with a server 110 via one or more networks 106. In embodiments, the network(s) 106 may support any type of data communication via any standard or technology (e.g., GSM, CDMA, TDMA, WCDMA, LTE, EDGE, OFDM, GPRS, EV-DO, UWB, Internet, IEEE 802 including Ethernet, WiMAX, Wi-Fi, Bluetooth, and others). The server 110 may be configured to interface with or support a memory or storage 112 capable of storing various data. In embodiments, the storage 112 may store information related to the properties 101, 102, 103, and in particular may store information related to the various portions of the properties 101, 102, 103.

According to embodiments, the user 104 may use the electronic device 105 to capture image data that may depict a portion(s) of one of the properties 101, 102, 103 (e.g., the property 102). In particular, an image sensor or similar component of the electronic device 105 may capture the image data. The electronic device 105 may transmit the captured image data to the server 110 via the network(s) 106, and the server 110 may analyze the image data to identify or determine a set of elements depicted in the image data, and a set of characteristics associated therewith.

After identifying the set of elements and the set(s) of characteristics of the portion(s) of the property 102, the server 110 may access a desired set of characteristics for the set of elements, which may represent upgrades, repairs, improvements, or modifications to the set of elements. The server 110 may calculate a monetary amount associated with modifying the set of elements having the set of characteristics to achieve the desired set of characteristics. The server 110 may transmit data indicative of the monetary amount via the network(s) 106, and the electronic device 105 may present the data to the user 104, for example via a user interface.

It should be appreciated that the electronic device 105 may perform and facilitate various of the image processing and additional property analysis functionalities, in addition or as an alternative to the server 110 performing and facilitating the functionalities. In particular, the electronic device 105 may perform any or all of analyzing the captured image data, identifying or determining the set of elements and the set(s) of characteristics associated therewith, accessing the desired set(s) of characteristics, and calculating the monetary amount.

Figure 2:
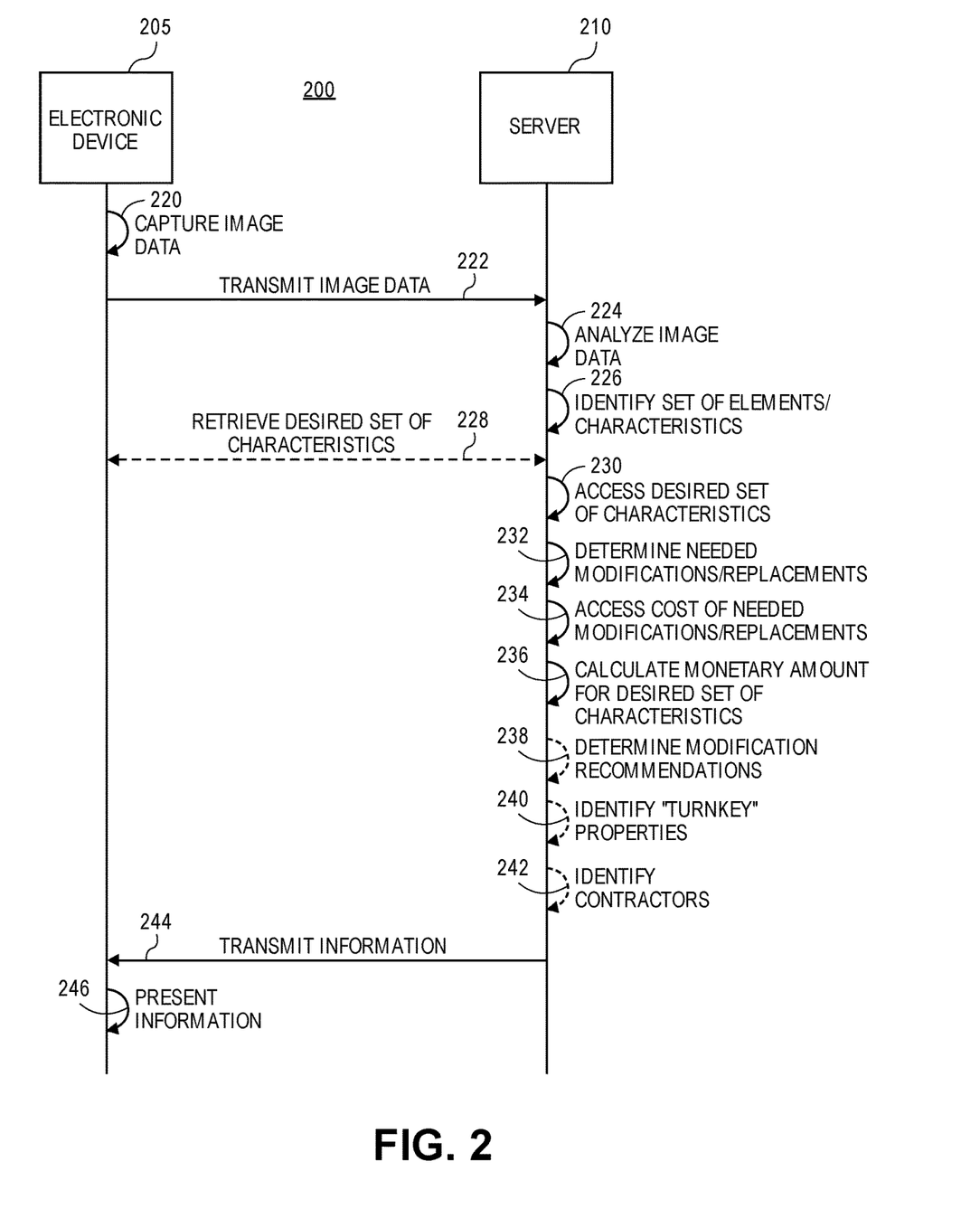
FIG. 2 depicts an exemplary signal diagram associated capturing images of properties, analyzing the images, and identifying property improvement opportunities, in accordance with some embodiments.

FIG. 2 depicts a signal diagram 200 associated with certain functionalities related to capturing images of properties, analyzing the images, and determining information related to property modifications or improvements. The signal diagram 200 includes various components including: an electronic device 205 (such as the electronic device 105 as discussed with respect to FIG. 1) and a server 210 (such as the server 105 as discussed with respect to FIG. 1). It should be appreciated that the electronic device 205 may support and execute an application configured to facilitate the communications and functionalities as described herein.

The signal diagram 200 may begin when the electronic device 205 captures (220) image data that may depict one or more portions of a property. The image data may generally be digital image data and may be in the form of one or more digital images that may be captured by an image sensor of the electronic device 205. In embodiments, the image data may depict any portion(s) of an exterior and/or interior of the property. For example, the image data may depict any exterior side or angle of the property, the roof of the property, an elevation view of the property, any interior rooms of the property (e.g., bedroom, kitchen, bathroom, basement, study/office, family room, dining room, living room, etc.), any auxiliary buildings of the property (e.g., a shed or a garage), and/or any other portion that may be visible and capable of being captured in image data.

In an implementation, an application of the electronic device 205 may guide a user to capture specific views and/or portions of the property. For example, if the user is positioned in a kitchen of a property, the application may instruct the user to capture images of various appliances or fixtures, walls, countertops, cabinets, flooring, hardware, and/or the like. Further, a user interface of the electronic device 205 may display, as a "live view," the captured image data to enable the user to view and assess the captured image data.

The electronic device 205 may transmit (222) the image data to the server 210 via one of a variety of wireless network connections. In an implementation, the electronic device 205 may automatically transmit the image data to the server 210 in response to capturing the image data. In another implementation, a user of the electronic device 205 may select to transmit the image data to the server 210. For example, after the electronic device 205 captures a set of images depicting one or more portions of a property, the user may select to transmit the set of images to the server 210.

Generally, a portion of a property may include a set of elements, where an element may be any component, device, fixture, or the like that may be a part of a property. For example, a bathroom may include the following elements: a shower, a toilet, a vanity, a bathtub, a bathroom floor, and bathroom hardware. According to embodiments, each of the set of elements may have an associated set of characteristics. In particular, the set of characteristics may be related to an appearance, type, make, model, make-up, condition, or quality of the associated element.

For example, characteristics for a kitchen countertop may include a type of material, dimensions of the material, an age of the countertop, a condition of the countertop (e.g., new, like new, worn, damaged), a quality of the countertop (e.g., low grade, medium grade, high grade), and/or others. For further example, characteristics for a roof of a home may include an age, a material, a style, a condition (e.g., new, like new, needs replacement), a construction quality (e.g., excellent, good, poor), and/or others. It should be appreciated that various characteristics of various elements of a property are envisioned.

The server 210 may include storage or memory configured to store data indicative of elements that may be found or included in a property, as well as characteristics thereof. Effectively, the server 210 may include a database that stores a variety of information inclusive of various property elements and characteristics relating thereto, that may be accessible by a variety of components.

After receiving the image data from the electronic device 205, the server 210 may analyze (224) the image data. It should be appreciated that the server 210 may employ various image processing techniques, algorithms, calculations, or the like in analyzing the image data. For example, the server 210 may employ pixelation, linear filtering, image editing, image restoration, principal components analysis, independent component analysis, hidden Markov models, anisotropic diffusion, partial differential equations, self-organizing maps, neural networks, wavelets, and/or others.

In analyzing the image data, the server 210 may identify (226) or determine a set of elements and characteristics thereof, where the set of elements may be associated with a portion of the property depicted in the image data. In particular, the server 210 may initially identify the portion of the property depicted in the image data, which may include an exterior portion (e.g., a roof) or an interior portion (e.g., a room such as a kitchen). The server 210 may further identify any elements that are depicted in the image data. For example, if the image data depicts a kitchen, the set of elements may include a stove, a refrigerator, an oven, a sink, a countertop, a backsplash, molding, a floor, a hood, cabinets, a dishwasher, hardware, and/or other elements that may be found in a kitchen. Additionally, the server 210 may identify or determine a set of characteristics associated with one or more of the identified elements. In particular, the server 210 may identify or determine any of the following associated with an identified element: appearance, type, make, model, make-up, condition, quality, and/or others.

In an optional embodiment, the server 210 may retrieve (228) a desired set of characteristics from the electronic device 205, where the desired set of characteristics may be associated with or correspond to the elements identified in the image data. In particular, the desired set of characteristics may represent a desired appearance, type, make, model, make-up, condition, quality, and/or others, for each of the elements, where a user of the electronic device 205 may specify the desired set of characteristics. In an implementation, the server 210 may provide data indicative of the identified set of elements and determined characteristics thereof to the electronic device 205, and the user may reference the data to select the desired set of characteristics. According to embodiments, the server 210 may request the electronic device 205 for the desired set of characteristics, and the electronic device 205 may transmit any inputted or selected desired set of characteristics. In a scenario, the user may specify an element that is not identified in the image data, as well as a desired characteristic(s) for the element. For example, if an existing kitchen does not have a dishwasher, the user may specify the inclusion of a dishwasher as well as a corresponding desired characteristic(s).

In an alternative embodiment, the server 210 may access (230) a desired set of characteristics. In particular, the desired set of characteristics may be default. For example, a default desired set of characteristics for a kitchen countertop may be "granite" and "high grade." In some scenarios, the desired set of characteristics may have been previously received from the user of the electronic device 205.

The server 210 may determine (232) any needed modifications, upgrades, replacements, and/or the like that may be needed for the set of elements to achieve the desired set of characteristics. In particular, the server 210 may determine what is needed to essentially replace or modify the set of elements having the set of characteristics depicted in the image data to include the desired set of characteristics. For example, if a damaged roof is depicted in the image data (i.e., the element is the roof and the characteristic is "damaged") and the user selects a repaired roof (i.e., the desired characteristic for the roof is "repaired"), then the server 210 determines that a roof repair is needed to achieve the repaired roof. For further example, if an outdated stove is depicted in the image data and the user selects a new stove, then the server 210 determines that the new stove is needed.

The server 210 may access (234) a cost of the needed modifications, upgrades, replacements, and/or the like determined in (232). In some implementations, the server 210 may locally store the costs, such as in a database, where the storage may periodically update as new cost data or information is received or available. In other implementations, the server 210 may access or contact a third-party source (e.g., a contractor(s), another database, etc.) for the cost data or information. For example, the server 210 may access data to determine that the cost of repairing a roof is $2,000. For further example, the server 210 may interface with a stove manufacturer to determine that the cost of a new stove is $600. According to embodiments, the cost may be dependent on the location of the property, for example if contractor rates vary across locations. Thus, the server 210 may retrieve a location of the electronic device 205 (e.g., accessed via a location module of the electronic device 205) that may be indicative of the location of the property.

The server 210 may calculate (236), based on the accessed cost(s) of (234), a total monetary amount of the needed modifications, upgrades, replacements, and/or the like determined in (232). In particular, the server 210 may sum the accessed cost(s) of (234) to calculate the total monetary amount. With reference to the above example, the total monetary amount for repairing the roof and replacing the stove is $2,600.

In an optional embodiment, the server 210 may determine (238) or identify modification recommendations for the property. In particular, the server 210 may determine or identify any modifications that are not indicated in the desired set of characteristics that may be of interest to the user. For example, if the desired set of characteristics is consistent with a bathroom remodel, the server 210 may identify a light fixture for the bathroom that is not included in the desired set of characteristics.

In an optional embodiment, the server 210 may identify (240) one or more "turnkey" properties that may be comparable to the property depicted in the image data, and that may have similar elements and characteristics thereof to those of the desired set of characteristics. Therefore, the one or more "turnkey" properties may represent properties that already include what the user of the electronic device 205 may desire in a property. In some scenarios, the one or more "turnkey" properties may be available to purchase or rent, and therefore may have an associated price.

In an optional embodiment, the server 210 may identify (242) contractors or service providers who may be capable or available to perform the needed modifications, upgrades, replacements, and/or the like determined in (232). The server 210 may further receive quotes or estimates from the identified contractors or service providers.

The server 210 may transmit (244) any determined data or information to the electronic device 205. In particular, the server 210 may transmit information indicative of needed modifications, upgrades, replacements, and/or the like, accessed costs, calculated monetary amounts, modification recommendations, "turnkey" properties, and/or contractors or service providers. After receiving the information, the electronic device 205 may present (246) the information in a user interface, thereby enabling the user to view or access the information, make various selections, and facilitate various actions or functionalities.

Although FIG. 2 depicts each of the electronic device 205 and the server 210 performing specific functionalities and analyses, it should be appreciated that either of the electronic device 205 or the server 210 may perform certain of the functionalities and analyses. For example, even though FIG. 2 depicts the server 210 as analyzing the image data, identifying the set of elements and characteristics thereof, determining the needed modifications, upgrades, replacements, and/or the like, accessing the costs, calculating the monetary amount, determining the modification recommendations, identifying the "turnkey" properties, and identifying the contractors, it should be appreciated that the electronic device 205 may additionally or alternatively perform these functionalities, where the electronic device 205 may request and/or retrieve any needed information or data from the server 210.

FIGS. 3A-3D illustrate exemplary interfaces associated with determining and presenting information related to property upgrades. One or more electronic devices (e.g., a mobile device, such as a smartphone) may be configured to display the interfaces and/or receive selections and inputs via the interfaces. For example, a dedicated application that is configured to operate on the electronic device may display the interfaces. It should be appreciated that the interfaces are merely exemplary and that alternative or additional content is envisioned.

Figure 3A:
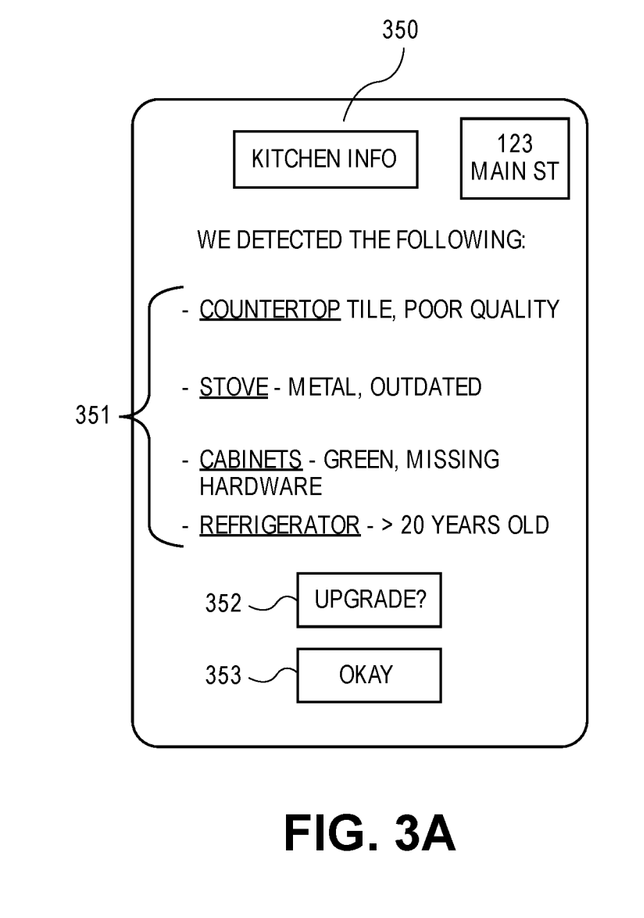
FIGS. 3A-3D depict exemplary user interfaces associated with identifying and presenting property improvement opportunities, in accordance with some embodiments.

FIG. 3A illustrates an interface 350 depicting property elements and characteristics associated therewith, where the elements may be associated with a portion of a property (as shown: a kitchen of 123 Main St), and identified or determined from image data depicting the elements. The interface 350 may include a listing 351 of the elements and characteristics thereof. For example, one of the elements included in the listing 351 is a countertop that is constructed of tile and is of poor quality. The interface 350 may further include an "okay" selection 353 that, upon selection, may cause the electronic device to dismiss the interface 350. Additionally, the interface 350 may include an "upgrade" selection 352 that, upon selection, may cause the electronic device to initiate processing related to determining information related to upgrading or replacing the elements.

Figure 3B:
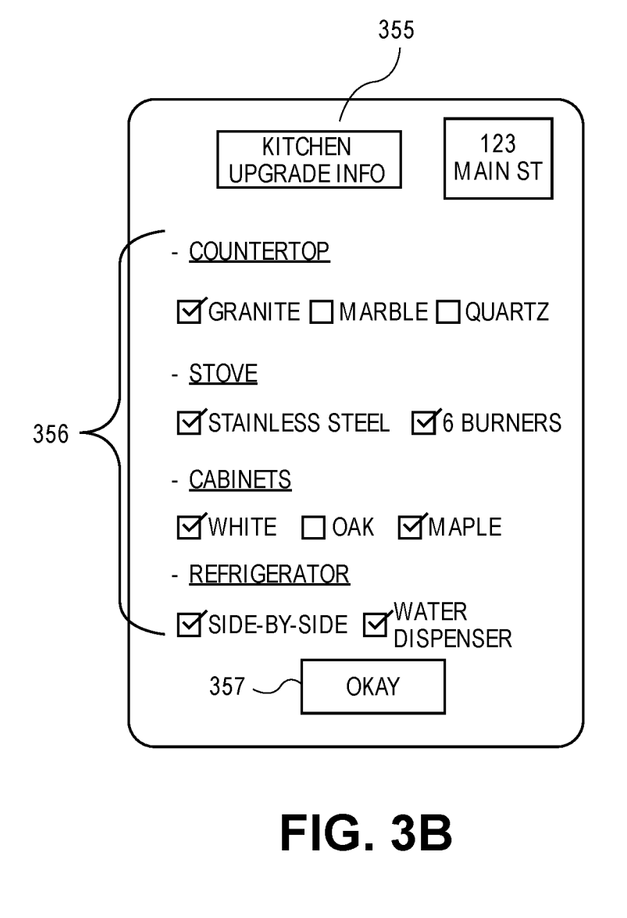

FIG. 3B illustrates an interface 355 depicting selections related to a desired set of characteristics for the elements of the property, where the desired set of characteristics may correspond to the listing 351 of FIG. 3A. In particular, the interface 355 may include a listing 356 of the elements and selections for the desired set of characteristics. The user of the electronic may make any appropriate selections in the listing 356. For example, for the stove included in the listing 356, the user may select stainless steel with six (6) burners. The interface 355 may include an "okay" selection 357 that, upon selection, may cause the electronic device to dismiss the interface 355 and initiate additional processing.

Figure 3C:
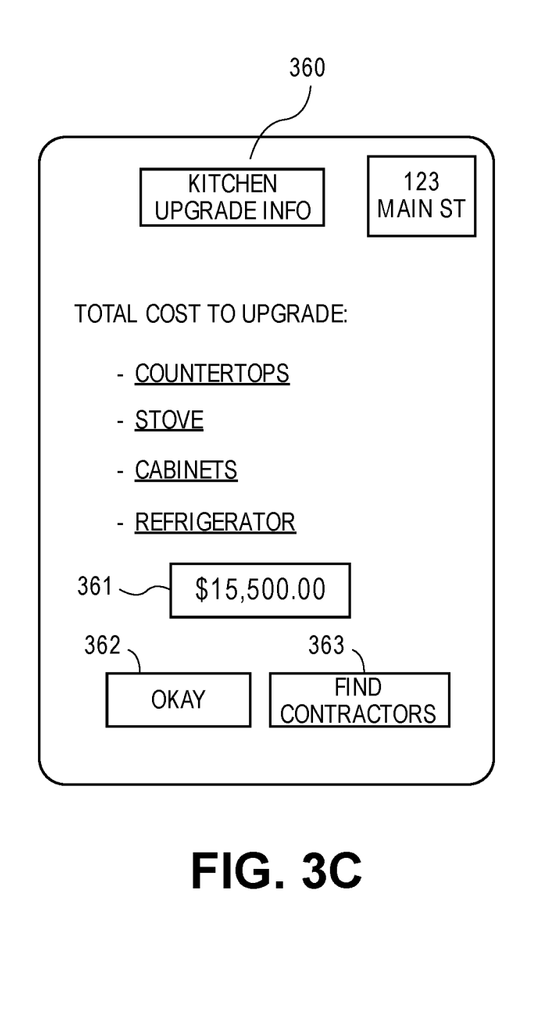

FIG. 3C depicts an interface 360 depicting information needed to achieve the desired set of characteristics selected in the listing 356 of FIG. 3B. In particular, the interface 360 may indicate that a total cost (361) of upgrading or replacing the countertops, the stove, the cabinets, and the refrigerator according to the listing 356 is $15,500. The interface 360 may include an "okay" selection 362 that, upon selection, may cause the electronic device to dismiss the interface 360, and a "find contractor" selection 363 that, upon selection, may cause the electronic device to initiate processing relating to locating a relevant contractor(s) for the upgrades/modifications.

Figure 3D:
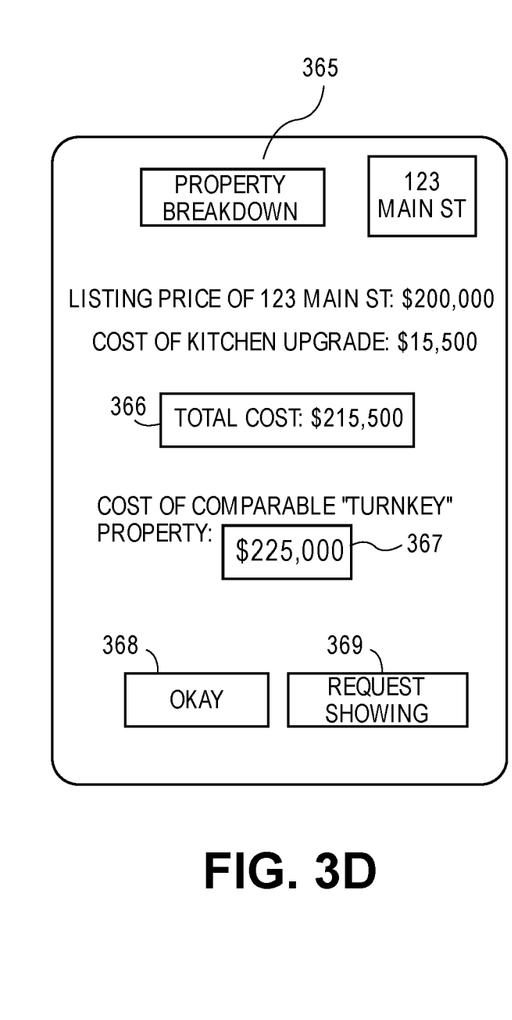

FIG. 3D depicts an interface 365 depicting information related to a cost comparison of performing the upgrades/modifications to the identified property versus a cost of a comparable "turnkey" property. In particular, the interface 365 illustrates that the total cost of purchasing the property (i.e., 123 Main St) and performing the identified upgrades/modifications is $215,500 (366), and that the cost of a comparable "turnkey" property is $225,000 (367). Accordingly, the user may determine that purchasing the originally-identified property and performing the upgrades/modifications may be advantageous. The interface 365 may include an "okay" selection 368 that, upon selection, may cause the electronic device to dismiss the interface 365, and a "request showing" selection 369 that, upon selection, may cause the electronic device to initiate processing related to identifying a real estate agent and scheduling a showing of the property (i.e., 123 Main St).

Figure 4A:
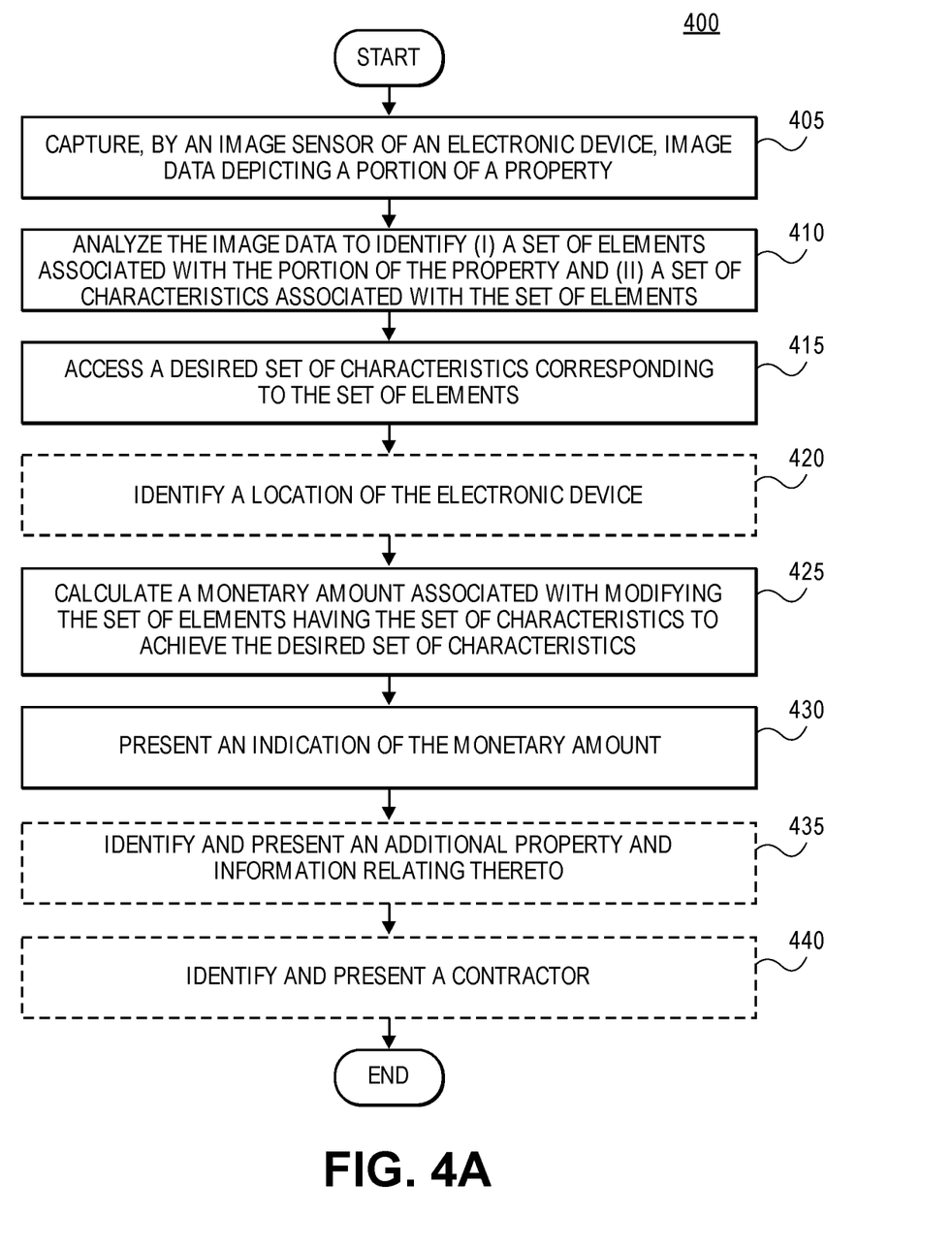
FIG. 4A is a flow diagram associated with analyzing image data to identify property modifications, in accordance with some embodiments.

FIG. 4A depicts a block diagram of an exemplary method 400 of analyzing image data to identify property modifications. The method 400 may be facilitated by an electronic device of a user (such as the electronic device 105) that may communicate with one or more servers via a wireless network connection. In particular, the electronic device may request or retrieve data from the one or more servers that the electronic device may use to facilitate the method 400.

The method 400 may begin with an image sensor of the electronic device capturing (405) image data depicting a portion of a property. In embodiments, the image data may be in the form of one or more digital images, where the digital images may depict any portion(s) of an exterior and/or interior portion(s) of the property. Further, in embodiments, a user interface of the electronic device may display the captured image data, which may be in the form of a "live view" for the user to assess.

The electronic device may analyze (block 410) the image data to identify (i) a set of elements associated with the portion of the property and (ii) a set of characteristics associated with the set of elements. In embodiments, the electronic device may employ any type of image processing technique or calculation in identifying the information. The electronic device may also access (block 415) a desired set of characteristics corresponding to the set of elements. In embodiments, the electronic device may receive, via a user interface, a selection of the desired set of characteristics, or may locally or remotely access the desired set of characteristics.

The electronic device may optionally identify (block 420) a location of the electronic device. In embodiments, the location may be identified using a location module of the electronic device. The electronic device may also calculate (block 425) a monetary amount associated with modifying the set of elements having the set of characteristics to achieve the desired set of characteristics. In some embodiments, the electronic device may calculate the monetary amount based at least in part on the location identified in block 420. In other embodiments, the electronic device may calculate the monetary amount based on any replacement cost(s) for any of the set of elements that may need replacement, or based on any cost(s) associated with modifying any of the set of elements.

The electronic device may also present (block 430) an indication of the monetary amount, as well as any information associated therewith, including any associated costs. The electronic device may optionally identify and present (block 435) an additional property and information related thereto. According to embodiments, the additional property may be a "turnkey" property that is similar to the property and that may have a set of elements having the desired set of characteristics, and the information may include a price, location, and/or other details.

The electronic device may also identify and present (block 440) a contractor who may be capable of modifying the set of elements to achieve the desired set of characteristics. In embodiments, the electronic device may identify the contractor based on expertise, and may present information such as availability and cost.

FIG. 4A depicts a block diagram of an exemplary method 400 of analyzing image data to identify property modifications. The method 400 may be facilitated by an electronic device of a user (such as the electronic device 105) that may communicate with one or more servers via a wireless network connection. In particular, the electronic device may request or retrieve data from the one or more servers that the electronic device may use to facilitate the method 400.

The method 400 may begin with an image sensor of the electronic device capturing (405) image data depicting a portion of a property. In embodiments, the image data may be in the form of one or more digital images, where the digital images may depict any portion(s) of an exterior and/or interior portion(s) of the property. Further, in embodiments, a user interface of the electronic device may display the captured image data, which may be in the form of a "live view" for the user to assess.

The electronic device may analyze (block 410) the image data to identify (i) a set of elements associated with the portion of the property and (ii) a set of characteristics associated with the set of elements. In embodiments, the electronic device may employ any type of image processing technique or calculation in identifying the information. The electronic device may also access (block 415) a desired set of characteristics corresponding to the set of elements. In embodiments, the electronic device may receive, via a user interface, a selection of the desired set of characteristics, or may locally or remotely access the desired set of characteristics.

The electronic device may optionally identify (block 420) a location of the electronic device. In embodiments, the location may be identified using a location module of the electronic device. The electronic device may also calculate (block 425) a monetary amount associated with modifying the set of elements having the set of characteristics to achieve the desired set of characteristics. In some embodiments, the electronic device may calculate the monetary amount based at least in part on the location identified in block 420. In other embodiments, the electronic device may calculate the monetary amount based on any replacement cost(s) for any of the set of elements that may need replacement, or based on any cost(s) associated with modifying any of the set of elements.

The electronic device may also present (block 430) an indication of the monetary amount, as well as any information associated therewith, including any associated costs. The electronic device may optionally identify and present (block 435) an additional property and information related thereto. According to embodiments, the additional property may be a "turnkey" property that is similar to the property and that may have a set of elements having the desired set of characteristics, and the information may include a price, location, and/or other details.

The electronic device may also identify and present (block 440) a contractor who may be capable of modifying the set of elements to achieve the desired set of characteristics. In embodiments, the electronic device may identify the contractor based on expertise, and may present information such as availability and cost.

Figure 4B:
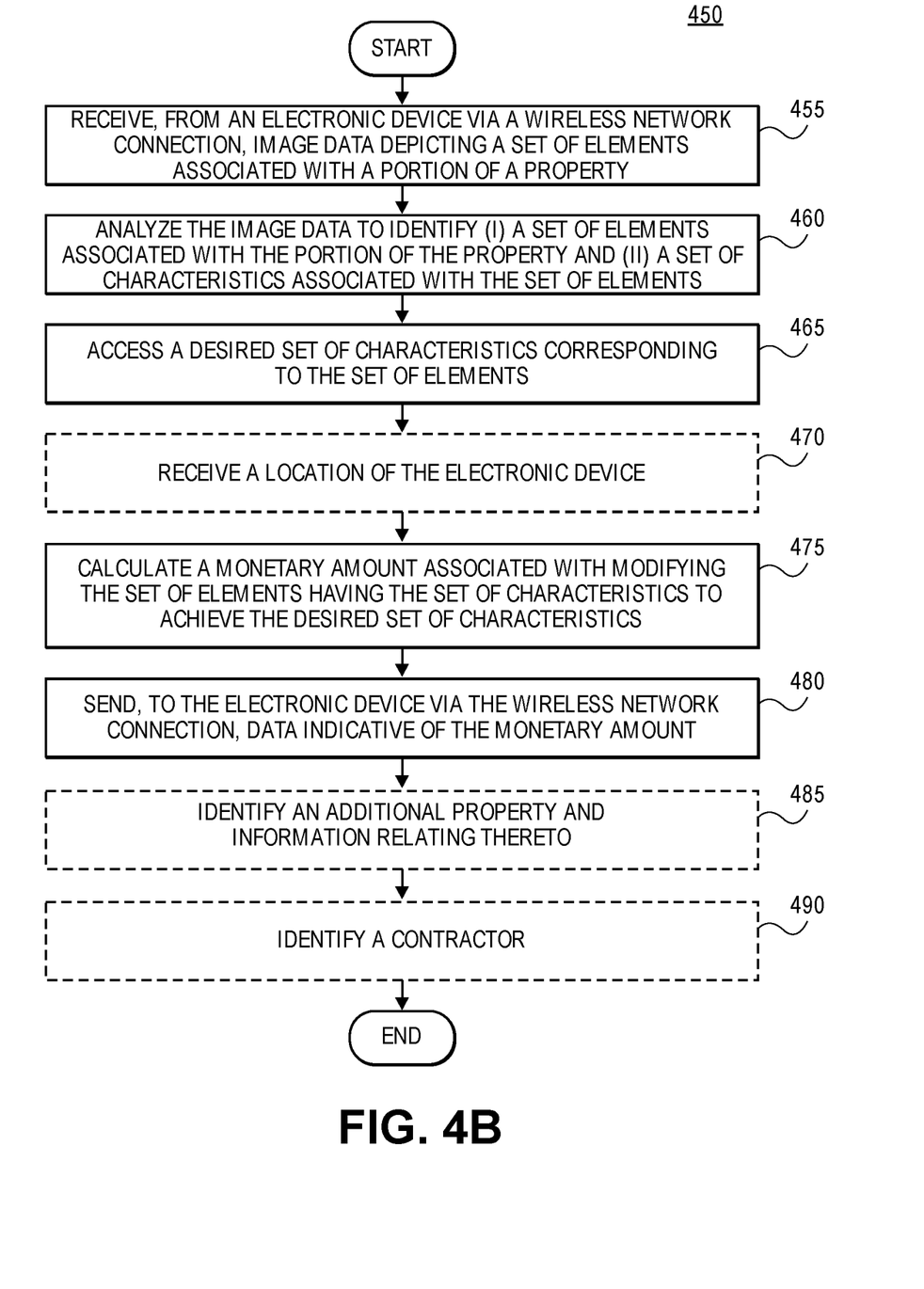
FIG. 4B is another flow diagram associated with analyzing image data to identify property modifications, in accordance with some embodiments.

FIG. 4B depicts a block diagram of an exemplary method 450 of analyzing image data to identify property modifications. The method 450 may be facilitated by a server (such as the server 110) that may communicate with an electronic device via a wireless network connection. In particular, the server may request or retrieve data from the electronic device that the server may use to facilitate the method 450.

The method 450 may begin with the server receiving (block 455), from an electronic device via a wireless network connection, image data depicting a portion of a property. In embodiments, the image data may be in the form of one or more digital images, where the digital images may depict any portion(s) of an exterior and/or interior portion(s) of the property.

The server may analyze (block 460) the image data to identify (i) a set of elements associated with the portion of the property and (ii) a set of characteristics associated with the set of elements. In embodiments, the server may employ any type of image processing technique or calculation in identifying the information. The server may also access (block 465) a desired set of characteristics corresponding to the set of elements. In embodiments, the server may receive, from the electronic device, a selection of the desired set of characteristics, or may locally or remotely access the desired set of characteristics.

The server may optionally receive (block 470) a location of the electronic device. In embodiments, the location may be identified using a location module of the electronic device. The server may also calculate (block 475) a monetary amount associated with modifying the set of elements having the set of characteristics to achieve the desired set of characteristics. In some embodiments, the server may calculate the monetary amount based at least in part on the location received in block 470. In other embodiments, the server may calculate the monetary amount based on any replacement cost(s) for any of the set of elements that may need replacement, or based on any cost(s) associated with modifying any of the set of elements.

The server may also send (block 480), to the electronic device via the wireless network connection, data indicative of the monetary amount, as well as any information associated therewith, including any associated costs. The server may optionally identify (block 485) an additional property and information related thereto. According to embodiments, the additional property may be a "turnkey" property that is similar to the property and that may have a set of elements having the desired set of characteristics, and the information may include a price, location, and/or other details.

The server may also identify (block 490) a contractor who may be capable of modifying the set of elements to achieve the desired set of characteristics. In embodiments, the server may identify the contractor based on expertise, and may send information such as availability and cost to the electronic device.

Figure 5:
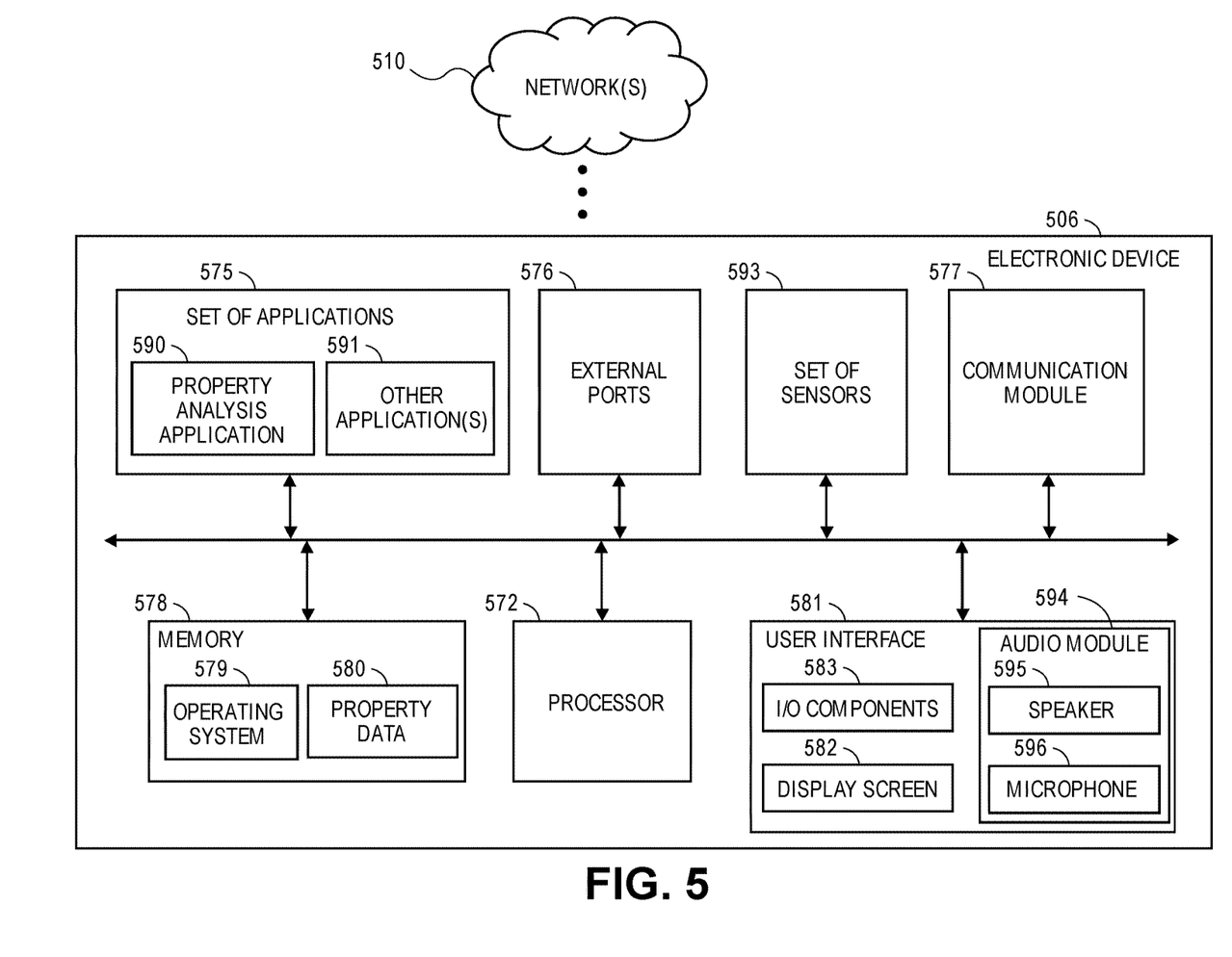
FIG. 5 is a block diagram of an exemplary electronic device, in accordance with some embodiments.

FIG. 5 illustrates a diagram of an exemplary electronic device 506 in which the functionalities as discussed herein may be implemented. It should be appreciated that the electronic device 506 may be configured to be connect to and communicate with various entities, components, and devices, as discussed herein. In one implementation, the electronic device 506 may be a portable device, such as the electronic device 105 as discussed with respect to FIG. 1. In another implementation, the electronic device 506 may be a server, such as the server 110 as discussed with respect to FIG. 1.

The electronic device 506 may include a processor 572 as well as a memory 578. The memory 578 may store an operating system 579 capable of facilitating the functionalities as discussed herein as well as a set of applications 575 (i.e., machine readable instructions). For example, one of the set of applications 575 may be an property analysis application 590 configured to analyze image data to identify elements and characteristics thereof, as well as perform calculations associated with property modifications, improvements, replacements, and the like. It should be appreciated that one or more other applications 591 are envisioned.

The processor 572 may interface with the memory 578 to execute the operating system 579 and the set of applications 575. According to some embodiments, the memory 578 may also store property data 580 that may indicate certain information associated with properties and costs, such as elements that may be found in properties and the costs thereof. The memory 578 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

The electronic device 506 may further include a communication module 577 configured to communicate data via one or more networks 510. According to some embodiments, the communication module 577 may include one or more transceivers (e.g., WWAN, WLAN, and/or WPAN transceivers) functioning in accordance with IEEE standards, 3GPP standards, or other standards, and configured to receive and transmit data via one or more external ports 576.

The electronic device 506 may further include a user interface 581 configured to present information to a user and/or receive inputs from the user. As shown in FIG. 5, the user interface 581 may include a display screen 582 and I/O components 583 (e.g., ports, capacitive or resistive touch sensitive input panels, keys, buttons, lights, LEDs). According to some embodiments, the user may access the electronic device 506 via the user interface 581 to review information and/or perform other functions. The user interface 581 may also include an audio module 594 that may include a speaker 595 and a microphone 596. The electronic device 506 may further include a set of sensors 593 such as a location module, an image sensor, and/or other sensors.

In some embodiments, the electronic device 506 may perform the functionalities as discussed herein as part of a "cloud" network or may otherwise communicate with other hardware or software components within the cloud to send, retrieve, or otherwise analyze data.

In general, a computer program product in accordance with an embodiment may include a computer usable storage medium (e.g., standard random access memory (RAM), an optical disc, a universal serial bus (USB) drive, or the like) having computer-readable program code embodied therein, wherein the computer-readable program code may be adapted to be executed by the processor 572 (e.g., working in connection with the operating system 579) to facilitate the functions as described herein. In this regard, the program code may be implemented in any desired language, and may be implemented as machine code, assembly code, byte code, interpretable source code or the like (e.g., via C, C++, Java, Actionscript, Objective-C, Javascript, CSS, XML). In some embodiments, the computer program product may be part of a cloud network of resources.

Although the following text sets forth a detailed description of numerous different embodiments, it should be understood that the legal scope of the invention may be defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that may be permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that may be temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it may be communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment, or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment.

As used herein, the terms "comprises," "comprising," "may include," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also may include the plural unless it is obvious that it is meant otherwise.

This detailed description is to be construed as examples and does not describe every possible embodiment, as describing every possible embodiment would be impractical, if not impossible. One could implement numerous alternate embodiments, using either current technology or technology developed after the filing date of this application.

What is claimed is:

1. A computer-implemented method in an electronic device of identifying property modifications, the method comprising:
   analyzing, by a processor, image data to identify a set of elements associated with a portion of a property;
   accessing a desired set of characteristics corresponding to the set of elements;
   determining, based on at least a portion of the desired set of characteristics, at least one modification recommendation for the property, wherein the at least one modification recommendation is not included in the desired set of characteristics;
   identifying an additional property comparable to the property and having the desired set of characteristics corresponding to the set of elements, the additional property having a price; and
   presenting, in the user interface, (i) an indication of the price of the additional property, and (ii) an indication of the at least one modification recommendation.

2. The computer-implemented method of claim 1, wherein analyzing the image data to identify the set of elements comprises:
   analyzing the image data to identify (i) the set of elements and (ii) a set of characteristics associated with the set of elements.

3. The computer-implemented method of claim 1, wherein accessing the desired set of characteristics comprises:
   enabling a user to select, via a user interface of the electronic device, the desired set of characteristics corresponding to the set of elements.

4. The computer-implemented method of claim 1, wherein the set of elements associated with the portion of the property has a set of characteristics, and wherein the method further comprises:
   calculating a monetary amount associated with modifying the set of elements having the set of characteristics to achieve the desired set of characteristics.

5. The computer-implemented method of claim 4, further comprising:
   identifying, using a location module, a location of the electronic device;
   wherein calculating the monetary amount comprises:
   calculating, based on at least the location of the electronic device, the monetary amount associated with modifying the set of elements having the set of characteristics to achieve the desired set of characteristics.

6. The computer-implemented method of claim 4, further comprising:
   identifying a price associated with the property;
   calculating a price difference between (i) a sum of the monetary amount and the price associated with the property and (ii) the price of the additional property; and
   presenting, in the user interface, an indication of the price difference.

7. The computer-implemented method of claim 4, further comprising:
   identifying a contractor who specializes in modifying the set of elements having the set of characteristics to achieve the desired set of characteristics; and
   presenting, in the user interface, an indication of the contractor.

8. The computer-implemented method of claim 4, wherein analyzing the image data to identify the set of elements comprises:
   analyzing the image data to identify that at least a portion of the set of elements need replacement;
   and wherein calculating the monetary amount associated with modifying the set of elements having the set of characteristics to achieve the desired set of characteristics comprises:
   calculating the monetary amount based on at least a replacement cost for the portion of the set of elements.

9. The computer-implemented method of claim 4, wherein calculating the monetary amount associated with modifying the set of elements having the set of characteristics to achieve the desired set of characteristics comprises:
   determining, based on the set of characteristics and the desired set of characteristics, a set of needed modifications;
   accessing a cost of each of the set of needed modifications; and
   calculating the monetary amount based on at least the cost of each of the set of needed modifications.

10. The computer-implemented method of claim 4, further comprising:
    presenting, in the user interface, an indication of the monetary amount.

11. A system configured to identify property modifications, comprising:
    a user interface;
    a memory configured to store non-transitory computer executable instructions; and a processor configured to interface with the user interface and the memory, wherein the processor is configured to execute the non-transitory computer executable instructions to cause the processor to:
- analyze image data to identify a set of elements associated with a portion of a property,
- access a desired set of characteristics corresponding to the set of elements,
- determine, based on at least a portion of the desired set of characteristics, at least one modification recommendation for the property, wherein the at least one modification recommendation is not included in the desired set of characteristics,
- identify an additional property comparable to the property and having the desired set of characteristics corresponding to the set of elements, the additional property having a price, and
- cause the user interface to present (i) an indication of the price of the additional property, and (ii) an indication of the at least one modification recommendation.

12. The system of claim 11, wherein the processor analyzes the image data to further identify a set of characteristics associated with the set of elements.

13. The system of claim 11, wherein to access the desired set of characteristics, the processor is configured to:
- receiving, from a user via a user interface, the desired set of characteristics corresponding to the set of elements.

14. The system of claim 11, wherein the set of elements associated with the portion of the property has a set of characteristics, and wherein the processor is further configured to:
- calculate a monetary amount associated with modifying the set of elements having the set of characteristics to achieve the desired set of characteristics.

15. The system of claim 14, wherein the processor is further configured to:
- identifying, using a location module, a location of the electronic device;
- wherein calculating the monetary amount comprises:
  - calculating, based on at least the location of the electronic device, the monetary amount associated with modifying the set of elements having the set of characteristics to achieve the desired set of characteristics.

16. The system of claim 14, wherein the processor is further configured to:
- identifying a price associated with the property;
- calculating a price difference between (i) a sum of the monetary amount and the price associated with the property and (ii) the price of the additional property; and
- presenting, in the user interface, an indication of the price difference.

17. The system of claim 14, wherein the processor is further configured to:
- identifying a contractor who specializes in modifying the set of elements having the set of characteristics to achieve the desired set of characteristics; and
- presenting, in the user interface, an indication of the contractor.

18. The system of claim 14, wherein the processor analyzes the image data to identify that at least a portion of the set of elements need replacement, and wherein the processor calculates the monetary amount based on at least a replacement cost for the portion of the set of elements.

19. The system of claim 14, wherein to calculate the monetary amount, the processor is configured to:
- determine, based on the set of characteristics and the desired set of characteristics, a set of needed modifications,
- access a cost of each of the set of needed modifications, and
- calculate the monetary amount based on at least the cost of each of the set of needed modifications.

20. The system of claim 14, wherein the processor is further configured to:
- cause the user interface to present an indication of the monetary amount.

\* \* \* \* \*